(12) United States Patent
Noda et al.

(10) Patent No.: US 8,317,336 B2
(45) Date of Patent: Nov. 27, 2012

(54) COOLING AND AIR FLOW EXHAUST FOR IMAGE PROJECTION APPARATUS

(75) Inventors: Toshiyuki Noda, Utsunomiya (JP); Shin-ichi Katsumata, Adachi-ku (JP)

(73) Assignee: Canon Kabushiki Kaisha (JP)

( * ) Notice: Subject to any disclaimer, the term of this patent is extended or adjusted under 35 U.S.C. 154(b) by 952 days.

(21) Appl. No.: 11/668,649

(22) Filed: Jan. 30, 2007

(65) Prior Publication Data

US 2007/0182934 A1    Aug. 9, 2007

(30) Foreign Application Priority Data

Feb. 3, 2006 (JP) ................. 2006-027728

(51) Int. Cl.
   *G03B 21/18* (2006.01)
(52) U.S. Cl. ............... 353/61; 353/57; 353/58; 353/59; 353/60; 348/748
(58) Field of Classification Search ............ 353/57, 353/58, 59, 60, 61; 348/748
See application file for complete search history.

(56) References Cited

U.S. PATENT DOCUMENTS

| | | | |
|---|---|---|---|
| 5,860,719 A | 1/1999 | Suzuki et al. | |
| 6,254,238 B1 | 7/2001 | Takamatsu | |
| 6,280,038 B1 | 8/2001 | Fuse et al. | |
| 6,481,854 B1 | 11/2002 | Sugawara et al. | |
| 6,488,378 B1 * | 12/2002 | Tabuchi et al. | 353/52 |
| 6,739,831 B2 * | 5/2004 | Hsu et al. | 415/60 |
| 6,817,720 B2 * | 11/2004 | Shiraishi et al. | 353/61 |
| 7,014,320 B2 * | 3/2006 | Shiraishi | 353/57 |
| 7,018,049 B2 * | 3/2006 | Wu et al. | 353/58 |
| 7,052,143 B2 * | 5/2006 | Russell et al. | 353/58 |
| 7,441,903 B2 * | 10/2008 | Kim | 353/61 |
| 7,481,540 B2 * | 1/2009 | Morimoto et al. | 353/57 |
| 7,510,285 B2 * | 3/2009 | Takemi et al. | 353/61 |
| 2004/0017548 A1 * | 1/2004 | Denmeade | 353/31 |
| 2004/0100621 A1 * | 5/2004 | Shiraishi et al. | 353/57 |

(Continued)

FOREIGN PATENT DOCUMENTS

DE    19959257    7/2000

(Continued)

OTHER PUBLICATIONS

Extended European search report dated Apr. 23, 2007 for European Patent Application No. 07002230.6-2209.

*Primary Examiner* — Francis M Legasse, Jr.
*Assistant Examiner* — Bao-Luan Le
(74) *Attorney, Agent, or Firm* — Rossi, Kimms & McDowell LLP

(57) ABSTRACT

An image projection apparatus is disclosed which is capable of reducing noise when airflows from plural flow paths are taken in into a fan and exhausted therefrom. The apparatus comprises a first flow path through which a first airflow for cooling a light source passes, a second flow path through which a second airflow for cooling constituent parts other than the light source passes, a fan which exhausts air introduced from the first and second flow paths to the outside of the apparatus, a third flow path which introduces a third airflow to an exhaust area between the light source and the fan in the first flow path, and a light-shielding member which is provided in the exhaust area and shields the light from the light source.

7 Claims, 7 Drawing Sheets

U.S. PATENT DOCUMENTS

| | | | |
|---|---|---|---|
| 2004/0189953 A1* | 9/2004 | Wu et al. | 353/58 |
| 2004/0263796 A1* | 12/2004 | Russell et al. | 353/57 |
| 2005/0057730 A1* | 3/2005 | Okoshi | 353/61 |
| 2006/0170876 A1* | 8/2006 | Takemi et al. | 353/61 |

FOREIGN PATENT DOCUMENTS

| | | |
|---|---|---|
| EP | 1310805 | 5/2003 |
| JP | 11-082393 | 3/1999 |
| JP | 2002-245842 | 8/2002 |

* cited by examiner

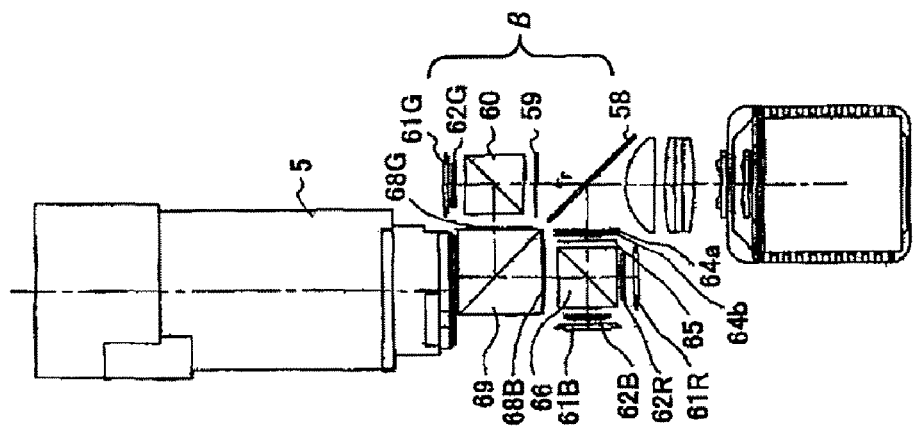
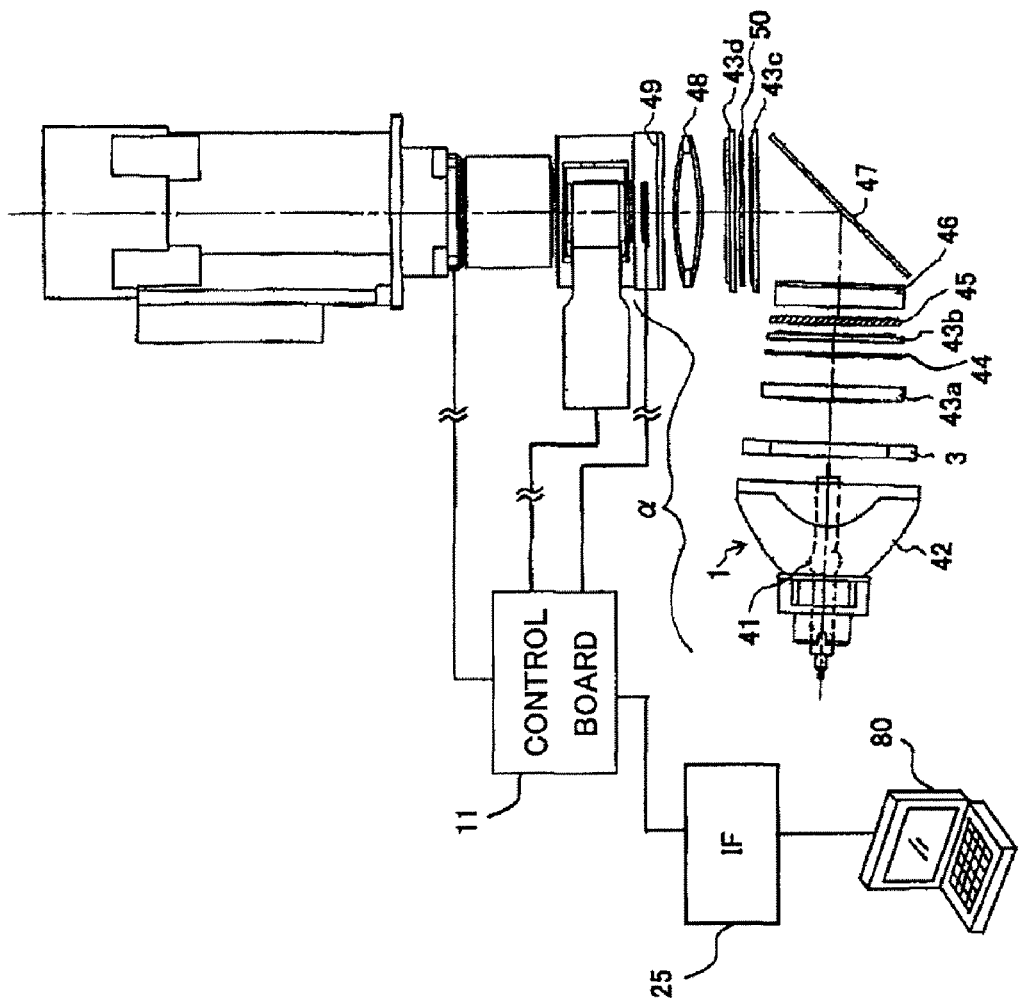
FIG. 5B
FIG. 5A

COOLING AND AIR FLOW EXHAUST FOR IMAGE PROJECTION APPARATUS

BACKGROUND OF THE INVENTION

The present invention relates to an image projection apparatus, such as a liquid crystal projector, which is provided with a cooling fan.

Projector is provided with heat-generating parts which are optical system parts including a light source, light modulation elements such as liquid crystal panels and optical elements, and electrical system parts including a light source ballast and a CPU.

To appropriately cool these heat-generating parts, the cooling method disclosed in Japanese Patent Laid-Open No. 2000-19496 uses plural fans. In this method, plural flow paths are formed in accordance with heat values of the heat-generating parts, such as a flow path for cooling a light source, a flow path for cooling a light modulation element and a flow path for cooling a light source ballast. The cooling airflows that passed through the flow paths are finally combined and exhausted by a fan.

This achieves cooling with high efficiency by using the minimum number of fans to reduce the size of the projector. Furthermore, this can decrease the number of exhaust openings through which noise generated inside the apparatus leaks. This may achieve a low-noise projector.

However, in such a configuration in which plural airflows flow into one fan from plural flow paths, when the plural airflows have greatly different flow velocities, noise generated in the fan is increased.

This phenomenon will be described using FIG. 7. FIG. 7 shows the phenomenon of generation of noise in an axial flow fan.

In this figure, reference numeral 18F denotes the axial flow fan. Reference symbol WA denotes an airflow which is taken in into the axial flow fan 18F from a first flow path. Reference symbol WB denotes an airflow which is taken in into the axial flow fan 18F from a second flow path. Reference numeral 18Fa denotes the leading edge of a blade of the axial flow fan 18F in its rotation direction.

The airflow WB has a velocity much higher than that of the airflow WA. In this case, the leading edge 18Fa of the blade perpendicularly cuts each airflow when the fan 18F is rotated. The leading edge 18Fa of the blade hits the side face of the airflow WB when the leading edge 18Fa that was cutting the slow airflow WA starts to cut the fast airflow WB, which generates wind noise. This wind noise is peaked at a frequency of an integral multiple of 'the number of the blades× the rotation speed thereof', which causes noise.

In addition, the leading edge 18Fa of the rotating blade forms different angles of attack with respect to the airflows WA and WB which have different velocities. The airflow WB providing a larger angle of attack becomes burble on the surface of the blade, which causes turbulent flow noise.

A conventional art is known, as disclosed in Japanese Patent Laid-Open No. H11-82393, in which an airflow is uniformly introduced to a fan to allow the airflow to be uniformly blown to a heat-generating part, thereby carrying out cooling with good efficiency.

The art disclosed in Japanese Patent Laid-Open No. H11-82393, however, is an art for a case of a single airflow and an art focused on the flow volume distribution on the blowout side of the fan. In other words, the art does not aim to reduce noise when plural airflows are taken in into one fan.

BRIEF SUMMARY OF THE INVENTION

The present invention provides an image projection apparatus capable of further reducing noise when airflows from plural flow paths are taken in into a fan and exhausted therefrom.

According to an aspect, the present invention provides an image projection apparatus which projects an image using light from a light source. The apparatus comprises a first flow path through which a first airflow for cooling the light source passes, a second flow path through which a second airflow for cooling constituent parts other than the light source passes, a fan which exhausts air introduced from the first and second flow paths to the outside of the apparatus, a third flow path which introduces a third airflow to an exhaust area between the light source and the fan in the first flow path, and a light-shielding member which is provided in the exhaust area and shields the light from the light source.

According to another aspect, the present invention provides an image display system which comprises the above-described image projection apparatus and an image supply apparatus which supplies image information to the image projection apparatus.

Other objects and features of the present invention will be apparent from the following description of preferred embodiments with reference to the accompanying drawings.

BRIEF DESCRIPTION OF THE DRAWINGS

FIGS. 5A and 5B are a plane view and a side view, respectively, showing the optical configuration in the liquid crystal projector of Embodiment 1.

DETAILED DESCRIPTION OF THE PREFERRED EMBODIMENTS

Preferred embodiments of the present invention will hereinafter be described with reference to the drawings.

Embodiment 1

(Overall Configuration of Projector)

Figure 4:
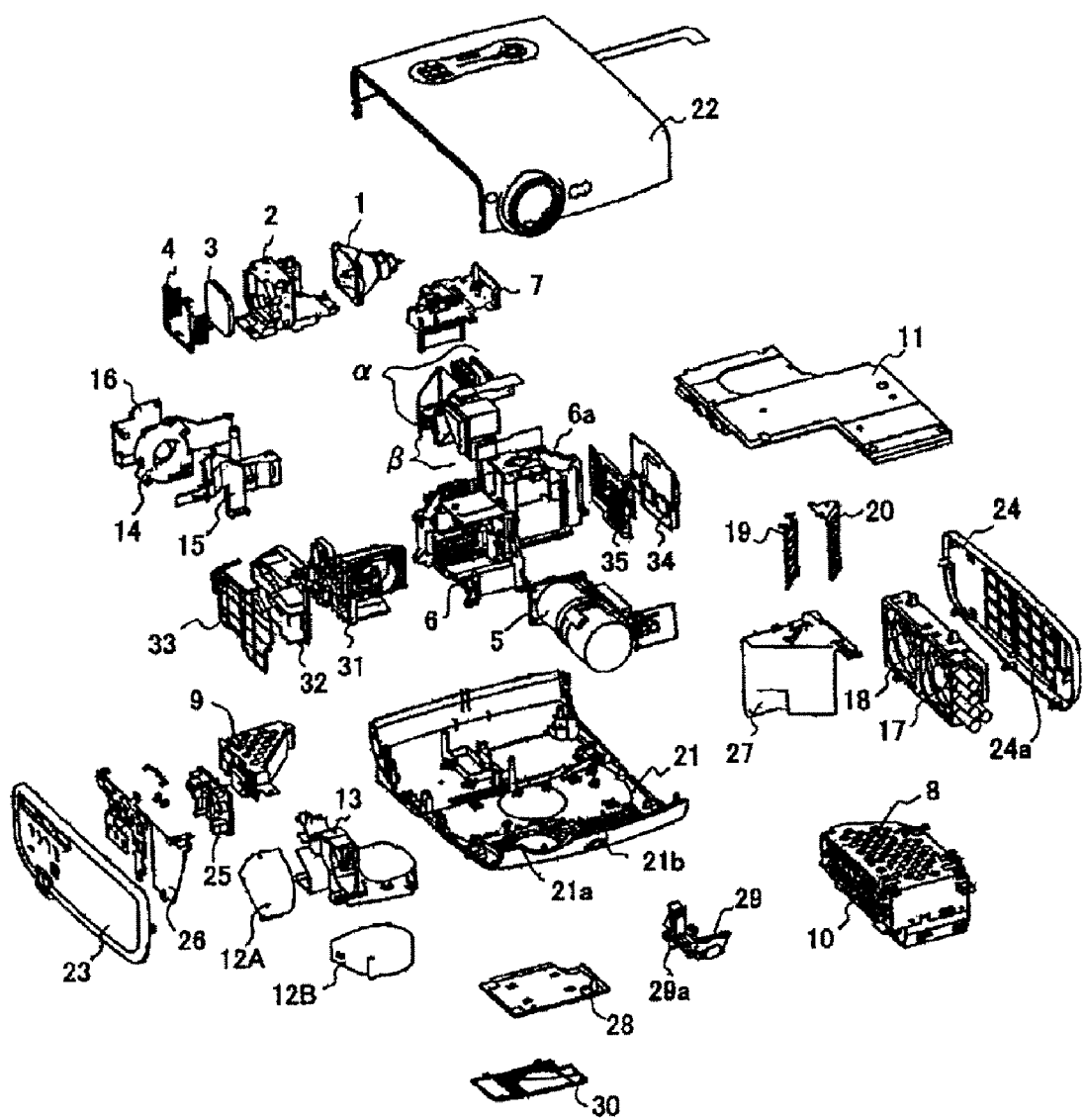
FIG. 4 is an exploded perspective view showing the overall configuration of the liquid crystal projector of Embodiment 1.

FIG. 4 shows the configuration of the liquid crystal projector (image projection apparatus) that is Embodiment 1 of the present invention.

In this figure, reference numeral 1 denotes a light source lamp, 2 a lamp holder which holds the lamp 1, 3 an explosion-proof glass, and 4 a glass holder. Reference symbol a denotes an illumination optical system which converts light from the lamp 1 into uniform and parallel light. Reference symbol β denotes a color separation/combination optical system. The color separation/combination optical system β separates the light from the lamp 1 into a red (R) light component, a green (G) light component and a blue (B) light component, guides them to liquid crystal panels for R, G, and B, respectively, and then combines the light components from the liquid crystal panels.

Reference numeral 5 denotes a projection lens barrel which projects light from the color separation/combination optical system β onto a screen (projection surface), not shown. A projection optical system is housed in the projection lens barrel 5.

Reference numeral 6 denotes an optical box which houses the lamp 1, the illumination optical system α and the color separation/combination optical system β, and to which the projection lens barrel 5 is fixed. The optical box 6 has a lamp case portion formed thereon, which surrounds the lamp 1.

Reference numeral 7 denotes an optical box lid which covers the optical box 6 housing the illumination optical system α and the color separation/combination optical system β. Reference numeral 8 denotes a PFC (Power Factor Correction) power supply board which generates DC power for each of circuit boards from a commercial power source, 9 a power supply filter board, and 10 a ballast power supply board which drives (lights) the lamp 1 together with the PFC power supply board 8.

Reference numeral 11 denotes a control board which drives the liquid crystal panels and controls lighting of the lamp 1 with power from the PFC power supply board 8.

Reference numerals 12A and 12B denote first and second optical system cooling fans, respectively, which take in air through an air intake port 21a formed in a lower exterior case 21, later described, to cool optical elements such as the liquid crystal panels and polarizing plates provided in the color separation/combination optical system β. Reference numeral 13 denotes a first RGB duct which guides the cooling airflows from the first and second optical system cooing fans 12A and 12B to the optical elements in the color separation/combination optical system β.

Reference numeral 14 denotes a lamp cooling fan which sends the blowing airflow to the lamp 1 to cool it. Reference numeral 15 denotes a first lamp duct which holds the lamp cooling fan 14 and guides the cooling airflow to the lamp 1. Reference numeral 16 denotes a second lamp duct which holds the lamp cooling fan 14 and forms the duct together with the first lamp duct 15.

Reference numeral 17 denotes a power source cooing fan which takes in air through an air intake port 21b formed in the lower exterior case 21 to circulate a cooling airflow within the PFC power supply board 8 and the ballast power supply board 10 to cool them. Reference numeral 18 denotes an exhaust fan which exhausts air that was provided from the lamp cooling fan 14 to the lamp 1 and whose temperature is increased by cooling the lamp 1 through an exhaust port 24a formed in a second side plate 24, later described.

Reference numeral 19 denotes a first exhaust louver and 20 a second exhaust louver, both of which allows passage of the exhaust air and have a light shielding function to prevent leakage of light from the lamp 1 to the outside of the projector.

The lower exterior case 21 houses the lamp 1, the optical box 6, the light source system boards 8 to 10, the control board 11 and the like.

Reference numeral 22 denotes an upper exterior case which covers the lower exterior case 21 housing the optical box 6 and the like. Reference numeral 23 denotes a first side plate which covers side openings formed by the cases 21 and 22 together with the second side plate 24. The lower exterior case 21 has the abovementioned air intake ports 21a and 21b formed therein, and the side plate 24 has the exhaust port 24a formed therein. The lower exterior case 21, the upper exterior case 22, the first side plate 23 and the second side plate 24 constitute the chassis (case) of the projector.

Reference numeral 25 denotes an interface board on which connectors for receiving various signals are mounted, and 26 an interface reinforcement plate attached to the inside face of the first side plate 23.

Reference numeral 27 denotes an exhaust box which guides the exhaust air from the lamp 1 to the exhaust fan 18 to prevent diffusion of the exhaust air in the chassis. The exhaust box 27 holds the first and second exhaust louvers 19 and 20.

Reference numeral 28 denotes a lamp lid. The lamp lid 28 is removably provided on the bottom of the lower exterior case 21 and is fixed thereto by screws, not shown. Reference numeral 29 denotes a set adjustment leg. The set adjustment leg 29 is fixed to the lower exterior case 21, and the height of its leg 29a can be adjustable. The adjustment of the height of the leg 29a enables adjustment of the inclination angle of the projector.

Reference numeral 30 denotes an RGB air intake plate which holds a filter, not shown, attached to the outside of the air intake port 21a formed in the lower exterior case 21.

Reference numeral 31 denotes a prism base which holds the color separation/combination optical system β. Reference numeral 32 denotes a box side cover which has duct-shaped portions for guiding the cooling airflows from the first and second cooling fans 12A and 12B for cooling the optical elements (including the liquid crystal panels) in the color separation/combination optical system β. Reference numeral 33 denotes a second RGB duct which forms the duct together with the box side cover 32.

Reference numeral 34 denotes an RGB board to which a flexible board extending from the liquid crystal panels disposed in the color separation/combination optical system β is connected and which is connected to the control board 11.

(Optical Configuration)

Next, description will be made of the configuration of the entire optical system formed of the abovementioned lamp 1, the illumination optical system α, the color separation/combination optical system β and the projection lens barrel (projection optical system) 5 with reference to FIGS. 5A and 5B. FIG. 5A shows a horizontal section of the optical system, and FIG. 5B shows a vertical section thereof.

In these figures, reference numeral 41 denotes a light-emitting tube which emits white light in a continuous spectrum, and 42 a reflector which collects light from the light-emitting tube 41 in a predetermined direction. The light-emitting tube 41 and the reflector 42 constitute the lamp 1.

Reference numeral 43a denotes a first cylinder array which is formed by arranging plural cylindrical lens cells each having a refractive power in a horizontal direction shown in FIG. 5A, 43b a second cylinder array which has plural cylindrical lens cells corresponding to the respective lens cells of the first cylinder array 43a. Reference numeral 44 denotes an ultra-violet absorbing filter, and 45 a polarization conversion element which converts non-polarized light into polarized light having a predetermined polarization direction.

Reference numeral 46 denotes a front compressor which is formed of a cylindrical lens having a refractive power in a vertical direction shown in FIG. 5B. Reference numeral 47 denotes a reflecting mirror which bends the optical axis from the lamp 1 by 90 degrees (in more detail, by 88 degrees).

Reference numeral 43c denotes a third cylinder array which is formed by arranging plural cylindrical lens cells each having a refractive power in the vertical direction. Reference numeral 43d denotes a fourth cylinder array which has plural cylindrical lens cells corresponding to the respective lens cells of the third cylinder array 43c.

Reference numeral 50 denotes a color filter which returns color light in a specific wavelength range to the lamp 1 for adjustment of color coordinates to predetermined values. Reference numeral 48 denotes a condenser lens. Reference numeral 49 denotes a rear compressor which is formed of a cylindrical lens having a refractive power in the vertical direction. The abovementioned components constitute the illumination optical system α.

Reference numeral 58 denotes a dichroic mirror which reflects light in the wavelength ranges of blue (B: for example, 430 nm to 495 nm) and red (R: for example, 590 nm to 650 nm) and transmits light in the wavelength range of green (G: for example, 505 nm to 580 nm). Reference numeral 59 denotes an entrance-side polarizing plate for G which includes a polarizing element attached on a transparent substrate and transmits only P-polarized light. Reference numeral 60 denotes a first polarization beam splitter which has a polarization beam splitting surface transmitting P-polarized light and reflecting S-polarized light.

Reference numerals 61R, 61G and 61B denote a reflective liquid crystal panel for R, a reflective liquid crystal panel for G and a reflective liquid crystal panel for B, respectively, each being a light modulation element (or image forming element) which reflects and image-modulates entering light. Reference numerals 62R, 62G and 62B denote a quarter-wave plate for R, a quarter-wave plate for G and a quarter-wave plate for B, respectively.

Reference numeral 64a denotes a trimming filter which returns orange light to the lamp 1 for enhancing the color purity of red. Reference numeral 64b denotes an entrance-side polarizing plate for R and B which includes a polarizing element attached on a transparent substrate and transmits only P-polarized light.

Reference numeral 65 denotes a color-selective phase plate which converts the polarization direction of red light by 90 degrees and does not convert the polarization direction of blue light. Reference numeral 66 denotes a second polarization beam splitter which has a polarization beam splitting surface transmitting p-polarized light and reflecting S-polarized light.

Reference numeral 68B denotes an emergence-side polarizing plate for B which transmits only the S-polarized light component of B light. Reference numeral 68G denotes an emergence-side polarizing plate for G which transmits only S-polarized light of G light. Reference numeral 69 shows a dichroic prism which transmits R light and B light, and reflects G light.

The abovementioned components from the dichroic mirror 58 to the dichroic prism 69 constitute the color separation/combination optical system β.

In this embodiment, the polarization conversion element 45 converts P-polarized light into S-polarized light. The P-polarized light and S-polarized light are herein described relative to the polarization direction of light at the polarization conversion element 45. On the other hand, the light entering the dichroic mirror 58 is considered relative to the polarization direction at the first and second polarization beam splitters 60 and 66, the light being regarded as P-polarized light. While the light emerging from the polarization conversion element 45 is S-polarized light, the S-polarized light is defined as P-polarized light when it enters the dichroic mirror 58.

Next, the optical effects will be described.

The light emitted from the light-emitting tube 41 is collected in a predetermined direction by the reflector 42. The reflector 42 has a paraboloidal shape, and the luminous flux from the focal point of the paraboloidal surface is converted into a luminous flux parallel to the axis of symmetry of the paraboloidal surface. However, since the light source in the light-emitting tube 41 is not an ideal point light source and has a finite size, the collected luminous flux contains a large amount of light component not in parallel with the axis of symmetry of the paraboloidal surface.

The luminous flux enters the first cylinder array 43a through the explosion-proof glass 3. The luminous flux entering the first cylinder array 43a is divided into plural luminous fluxes in accordance with the number of the cylindrical lens cells thereof and collected thereby to form plural luminous fluxes each of which has a band-like shape and which are arranged in the vertical direction. These luminous fluxes are passed through the ultraviolet absorbing filter 44 and the second cylinder array 43b and then form plural images of the light source near the polarization conversion element 45.

The polarization conversion element 45 is constituted by polarization beam splitting surfaces, reflecting surfaces, and half-wave plates. Each of the luminous fluxes enters the polarization beam splitting surface corresponding to its row and is separated into a P-polarized light component which is transmitted through the polarization beam splitting surface and an S-polarized light component which is reflected thereby.

The reflected S-polarized light component is reflected by the reflecting surface and then emerges in the same direction as the P-polarized light component. On the other hand, the transmitted P-polarized light component is transmitted through the half-wave plate to be converted into the same polarized light component as the S-polarized light component. Thus, the polarized luminous fluxes which are polarized in the same direction emerge from the polarization conversion element 45.

The plural luminous fluxes converted into the polarized luminous fluxes by the polarization conversion element 45 are compressed by the front compressor 46, reflected by the reflecting mirror 47 by 90 (88) degrees and then enter the third cylinder array 43c.

Each of the luminous flux entering the third cylinder array 43c is divided into plural luminous fluxes in accordance with the number of the cylindrical lens cells thereof and collected thereby to form plural luminous fluxes each of which has a band-like shape and which are arranged in the horizontal direction. The plural luminous fluxes are passed through the fourth cylinder array 43d and the condenser lens 48 and then enter the rear compressor 49.

With the optical actions of the front compressor 46, the condenser lens 48 and the rear compressor 49, rectangular images formed by the plural luminous fluxes are overlapped with each other to form a rectangular illumination area with a uniform brightness. Each of the reflective liquid crystal panels 61R, 61G and 61B is disposed in the illumination area.

The S-polarized light converted by the polarization conversion element 45 impinges on the dichroic mirror 58. The optical path of the G light transmitted through the dichroic mirror 58 will hereinafter be described.

The G light transmitted through the dichroic mirror 58 enters the entrance-side polarizing plate 59. The G light remains as P-polarized light (S-polarized light relative to the polarizing conversion element 45) after the separation by the dichroic mirror 58. The G light emerges from the entrance-side polarizing plate 59, enters the first polarization beam splitter 60 as P-polarized light and then is transmitted through the polarization beam splitting surface thereof to reach the reflective liquid crystal panel 61G.

An image supply apparatus 80 such as a personal computer, DVD player, VCR and a television tuner is connected to the IF board 25 of the projector. The control circuit 11 drives the reflective liquid crystal panels 61R, 61G and 61B based on image (video) information input from the image supply apparatus 80 and causes them to form original images for the respective colors. Thus, the light entering each reflective liquid crystal panel is modulated (image-modulated) in accordance with the original image and reflected thereby. The projector and the image supply apparatus 80 constitute an image display system.

The reflective liquid crystal panel 61G image-modulates the G light and reflects it. The P-polarized light component of the image-modulated G light is again transmitted through the polarization beam splitting surface of the first polarization beam splitter 60 and thereby returned toward the light source to be removed from light for projection. On the other hand, the S-polarized light component of the image-modulated G light is reflected by the polarization beam splitting surface of the first polarization beam splitter 60 to be directed toward the dichroic prism 69 as light for projection.

In a state in which all the polarized light components are converted into P-polarized light (in a black display state), adjusting the slow axis of the quarter-wave plate 62G provided between the first polarization beam splitter 60 and the reflective liquid crystal panel 61G to a predetermined direction can reduce the influence of a disturbance of the polarization state caused in the first polarization beam splitter 60 and the reflective liquid crystal panel 61G.

The G light that emerged from the first polarization beam splitter 60 enters the dichroic prism 69 as S-polarized light and then is reflected by the dichroic film surface of the dichroic prism 69 to reach the projection lens barrel 5.

On the other hand, the R light and B light reflected by the dichroic mirror 58 enter the trimming filter 64a. The R light and the B light remain as P-polarized light after the separation by the dichroic mirror 58. The R light and the B light are passed through the trimming filter 64a to remove the orange light component thereof, transmitted through the entrance-side polarizing plate 64b and then enter the color-selective phase plate 65.

The color-selective phase plate 65 has a function of rotating the polarization direction of only R light by 90 degrees. Thus, the R light and the B light enter the second light beam splitter 66 as S-polarized light and P-polarized light, respectively.

The R light entering the second polarization beam splitter 66 as S-polarized light is reflected by the polarization beam splitting surface of the second polarization beam splitter 66 to reach the reflective liquid crystal panel 61R. The B light entering the second polarization beam splitter 66 as P-polarized light is transmitted through the polarization beam splitting surface of the second polarization beam splitter 66 to reach the reflective liquid crystal panel 61B.

The R light entering the reflective liquid crystal panel 61R is image-modulated and reflected thereby. The S-polarized light component of the image-modulated R light is reflected again by the polarization beam splitting surface of the second polarization beam splitter 66 and thereby returned toward the light source to be removed from light for projection. On the other hand, the P-polarized light component of the image-modulated R light is transmitted through the polarization beam splitting surface of the second polarization beam splitter 66 to be directed toward the dichroic prism 69 as light for projection.

The B light entering the reflective liquid crystal panel 61B is image-modulated and reflected thereby. The P-polarized light component of the image-modulated B light is transmitted again through the polarization beam splitting surface of the second polarization beam splitter 66 and thereby returned toward the light source to be removed from light for projection. On the other hand, the S-polarized light component of the image-modulated B light is reflected by the polarization beam splitting surface of the second polarization beam splitter 66 to be directed toward the dichroic prism 69 as light for projection.

Adjusting each of the slow axes of the quarter-wave plates 62R and 62B provided between the second polarization beam splitter 66 and the reflective liquid crystal panels 61R and 61B, respectively, can reduce the influence of a disturbance of the polarization state in the black display state for each of the R light and the B light, as is the case for the G light.

Of the R light and B light that are thus combined into one luminous flux by the second polarization beam splitter 66 and then emerged therefrom, the B light is analyzed by the emergence-side polarizing plate 68B and then enters the dichroic prism 69. The R light is transmitted through the polarizing plate 68B with no change as P-polarized light and then enters the dichroic prism 69.

The analysis by the emergence-side polarizing plate 68B removes unnecessary components of the B light caused by passing the second polarization beam splitter 66, the reflective liquid crystal panel 61B and the quarter-wave plate 62B.

The R light and the B light for projection entering the dichroic prism 69 are transmitted through the dichroic film surface of the dichroic prism 69, combined with the G light reflected by the dichroic film surface and then reach the projection lens barrel 5.

The combined R, G and B light for projection is enlarged and projected by the projection optical system in the projection lens barrel 5 onto a projection surface such as a screen.

The optical paths described above are used when the reflective liquid crystal panels operate in a white display state. Description will hereinafter be made of optical paths when the reflective liquid crystal panels operate in the black display state.

First, the optical path of the G light will be described. The P-polarized light component of the G light transmitted through the dichroic mirror 58 enters the entrance-side polarizing plate 59 and the first polarization beam splitter 60, is transmitted through the polarization beam splitting surface thereof and then reaches the reflective liquid crystal panel 61G. Since the reflective liquid crystal panel 61G is in the black display state, the G light is reflected without image-modulation. Thus, the G light remains as P-polarized light after the reflection by the reflective liquid crystal panel 61G. Therefore, the G light is again transmitted through the polarization beam splitting surface of the first polarization beam splitter 60 and the entrance-side polarizing plate 59 and returned toward the light source to be removed from light for projection.

Next, the optical paths of the R light and B light will be described. The P-polarized light components of the R light and B light reflected by the dichroic mirror 58 enter the entrance-side polarizing plate 64b. They emerge from the entrance-side polarizing plate 64b and then enter the color-selective phase plate 65. Since the color-selective phase plate 65 has the function of rotating the polarization direction of only the R light by 90 degrees, the R light and the B light enter the second beam splitter 66 as S-polarized light and P-polarized light, respectively.

The R light entering the second polarization beam splitter 66 as the S-polarized light is reflected by the polarization beam splitting surface thereof and reaches the reflective liquid crystal panel 61R. The B light entering the second polarization beam splitter as the P-polarized light is transmitted through the polarization beam splitting surface thereof and reaches the reflective liquid crystal panel 61B.

Since the reflective liquid crystal panel 61R is in the black display state, the R light entering the reflective liquid crystal panel 61R is reflected without image-modulation. In other words, the R light remains as the S-polarized light after the reflection by the reflective liquid crystal panel 61R. Thus, the R light is again reflected by the polarization beam splitting surface of the second polarization beam splitter 66, transmitted through the entrance-side polarizing plate 64b and then returned toward the light source to be removed from light for projection. As a result, black is displayed.

The B light entering the reflective liquid crystal panel 61B is reflected without image-modulation since the reflective liquid crystal panel 61B is in the black display state. In other words, the B light remains as the P-polarized light after the reflection by the reflective liquid crystal panel 61B. Thus, the B light is again transmitted through the polarization beam splitting surface of the second polarization beam splitter 66, converted into P-polarized light by the color-selective phase plate 65, transmitted through the entrance-side polarizing plate 64b and returned toward the light source to be removed from light for projection.

(Cooling Structure)

Next, description will be made of the cooling structure in the projector of the present embodiment with reference to FIG. 6. As described above, the projector houses five fans 12A, 12B, 14, 17 and 18, which provide airflows into plural flow paths to cool the following respective cooling objects.

Figure 6:
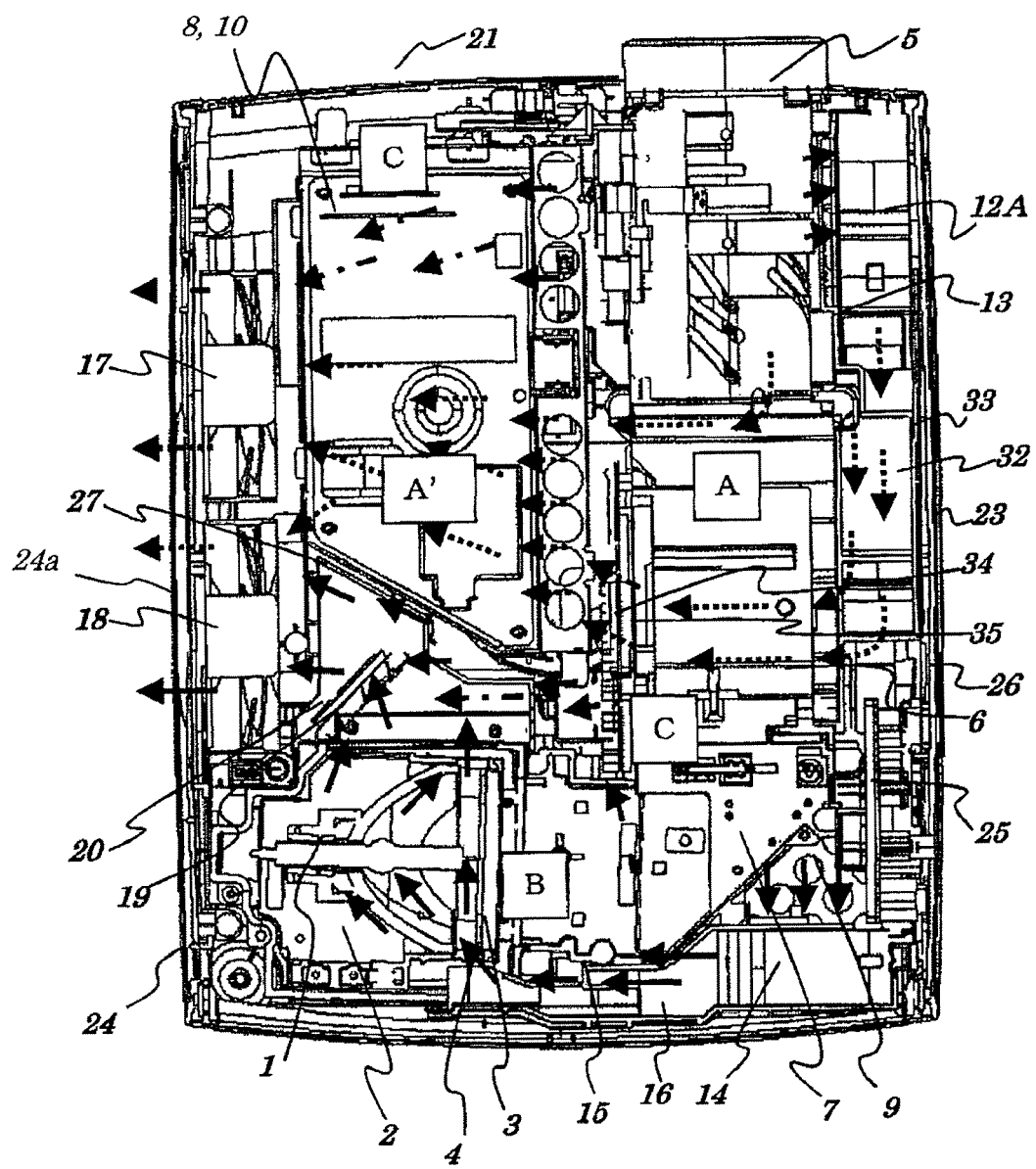
FIG. 6 is a plane view showing airflows in the liquid crystal projector of Embodiment 1.
Figure 7:
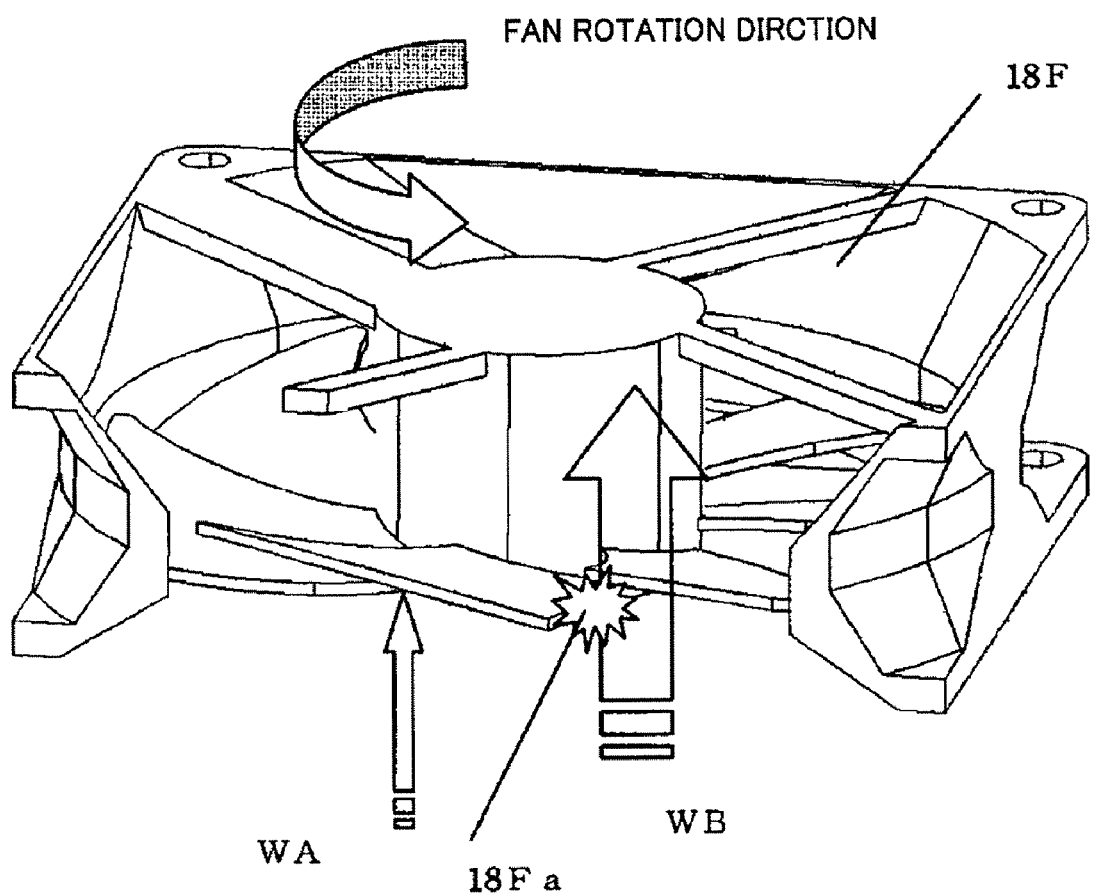
FIG. 7 is an illustration for explaining generation of wind noise.

In a flow path B (a first flow path) shown by solid arrows in FIG. 6, the air taken in into the chassis by the lamp cooling fan 14 is provided as cooling airflow to the lamp 1 through the duct formed by the first and second lamp ducts 15 and 16. The air that cooled the lamp 1 is guided to the exhaust box 27 to be exhausted to the outside of the chassis by the exhaust fan 18.

In a flow path A (a second flow path) shown by dotted arrows in FIG. 6, the air taken in by the first and second cooling fans 12A and 12B through the air intake port 21a formed below the projection lens barrel 5 from the outside of the chassis flows thereinto. The second cooling fan 12B is disposed below the projection lens barrel 5.

The cooling airflow passing through the flow path A cools the optical elements in the color separation/combination optical system β housed in the optical box 6. Most of the cooling airflow flows toward the PFC power source board 8 and the ballast power source board 10, which are disposed adjacent to the optical box 6, cools electrical parts mounted on the boards 8 and 10 and then is exhausted to the outside of the chassis by the exhaust fan 18 and the power source cooling fan 17.

Furthermore, in a flow path C shown by dashed-dotted arrows in FIG. 6, the air taken in through the air intake port 21b, not shown in FIG. 6, formed in the lower exterior case 21 flows into the chassis. The airflow passing through the flow path C is guided to the PFC power source board 8 and the ballast power source board 10 by the intake force of the power source cooling fan 17 or the exhaust fan 18 together with air present in the chassis. The air that cooled the boards 8 and 10 is exhausted to the outside of the chassis by the power source cooling fan 17 and the exhaust fan 18.

Figure 1:
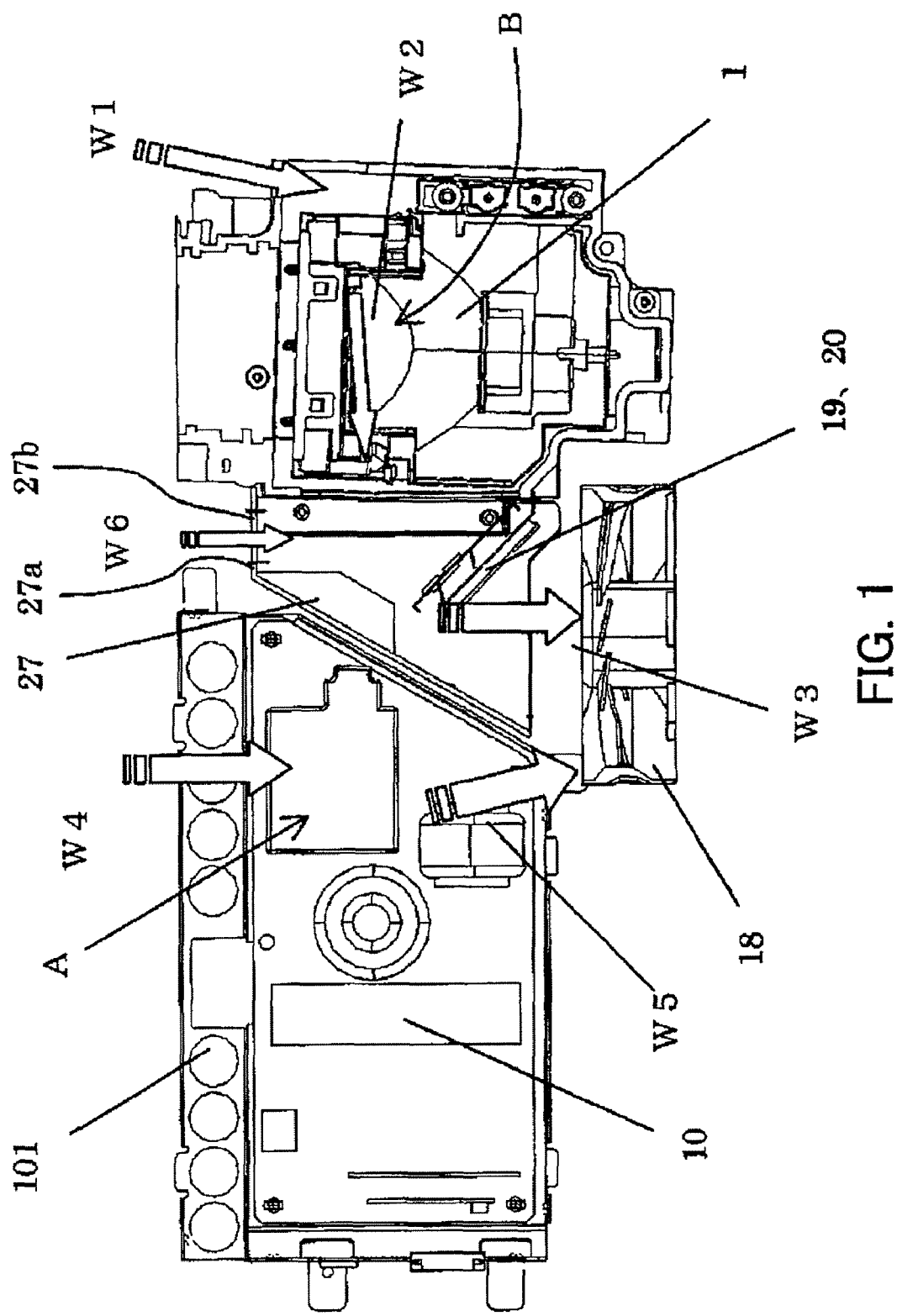
FIG. 1 is a plane view showing part of the cooling structure in the liquid crystal projector that is Embodiment 1 of the present invention.

More detailed description of the configuration around the exhaust fan 18 in the abovementioned cooling structure will be made with reference to FIGS. 1 and 2.

Heat-generating parts such as the lamp 1 in which the temperature of the reflector 2 increases up to near 500 degrees C. and plural electrical parts mounted on the PFC power source board 8 and ballast power source board 10 are provided around the exhaust fan 18.

The lamp 1 is cooled with a cooling airflow (a first airflow) W1 that is flowed through the flow path B by the lamp cooling fan 14. A cooling airflow (the first airflow) W2 whose temperature is increased by drawing heat from the lamp 1 flows into the exhaust box 27 that forms an exhaust area from the lamp 1 to the exhaust fan 18.

Then, the cooling airflow W2 is combined with a cooling airflow (a third airflow) W6 in the exhaust box 27 to form a cooling airflow W3, which is guided to the exhaust fan 18. The cooling airflow W6 will be described later.

Light emerging from the lamp 1 in its side direction may leak to the outside of the projector through the opening of the exhaust fan 18. To minimize such leak light, the first and second exhaust louvers (light-shielding members) 19 and 20 are provided in the exhaust box 27.

Each of the first exhaust louver 19 and the second exhaust louver 20 has a structure which shields light from the lamp 1 but allows the passage of the cooling airflow.

The temperature of the cooling airflow W1 is strictly managed to assure a normal light-emitting mechanism of the lamp 1 such that, for example, the temperature at the top of the sphere portion of the light-emitting tube 41 may be equal to or lower than 1,000 degrees C. and that at the bottom thereof may be 900±20 degrees C. Therefore, to adequately maintain these temperatures, the cooling airflow W1 needs to have a predetermined direction and a predetermined volume (velocity).

The PFC power source board 8 is held by a power source cover 81, and the ballast power source board 10 is held by a ballast cover 101. These covers 81 and 101 are incorporated with each other to form a boxy power source case E. The power source cover 81 and the ballast cover 101 have multiple holes formed by punching.

A cooling airflow (a second airflow) W4 shown in the figures flows into the power source case E through the holes formed thereon and cools the electrical parts mounted on the PFC power source board 8 and ballast power source board 10. Then, part of a cooling airflow (the second airflow) W5 whose temperature is increased by drawing heat from the electrical parts is guided to the exhaust fan 18.

In such a structure, the exhaust fan 18 takes in the cooling airflow W3 from the flow path B and the cooling airflow W5 from the flow path A, and exhausts them to the outside of the chassis through the exhaust port 24a formed in the second side plate 24.

The reason for combining the cooling airflow W6 with the cooling airflow W2 in the exhaust box 27 will be described.

The first exhaust louver 19 and second exhaust louver 20 disposed in the exhaust box 27 are large resistance to the cooling airflow W2 that cooled the lamp 1, which disturb the intake of the exhaust fan 18.

On the other hand, there is not anything which is large resistance to the cooling airflow W5 that cooled the PFC power source board 8 and ballast power source board 10.

Furthermore, the volume of the cooling airflow W1 which cools the lamp 1 is limited by the abovementioned temperature management conditions. Therefore, if the cooling airflow W6 is not combined with the cooling airflow W2, the exhaust fan 18 mainly takes in the cooling airflow W5.

As a result, the velocity of the cooling airflow W5 is much larger than that of the cooling airflow W3 (cooling airflow W2), which increases wind noise generated in the exhaust fan 18 to disturb reduction of noise of the projector.

Figure 2:
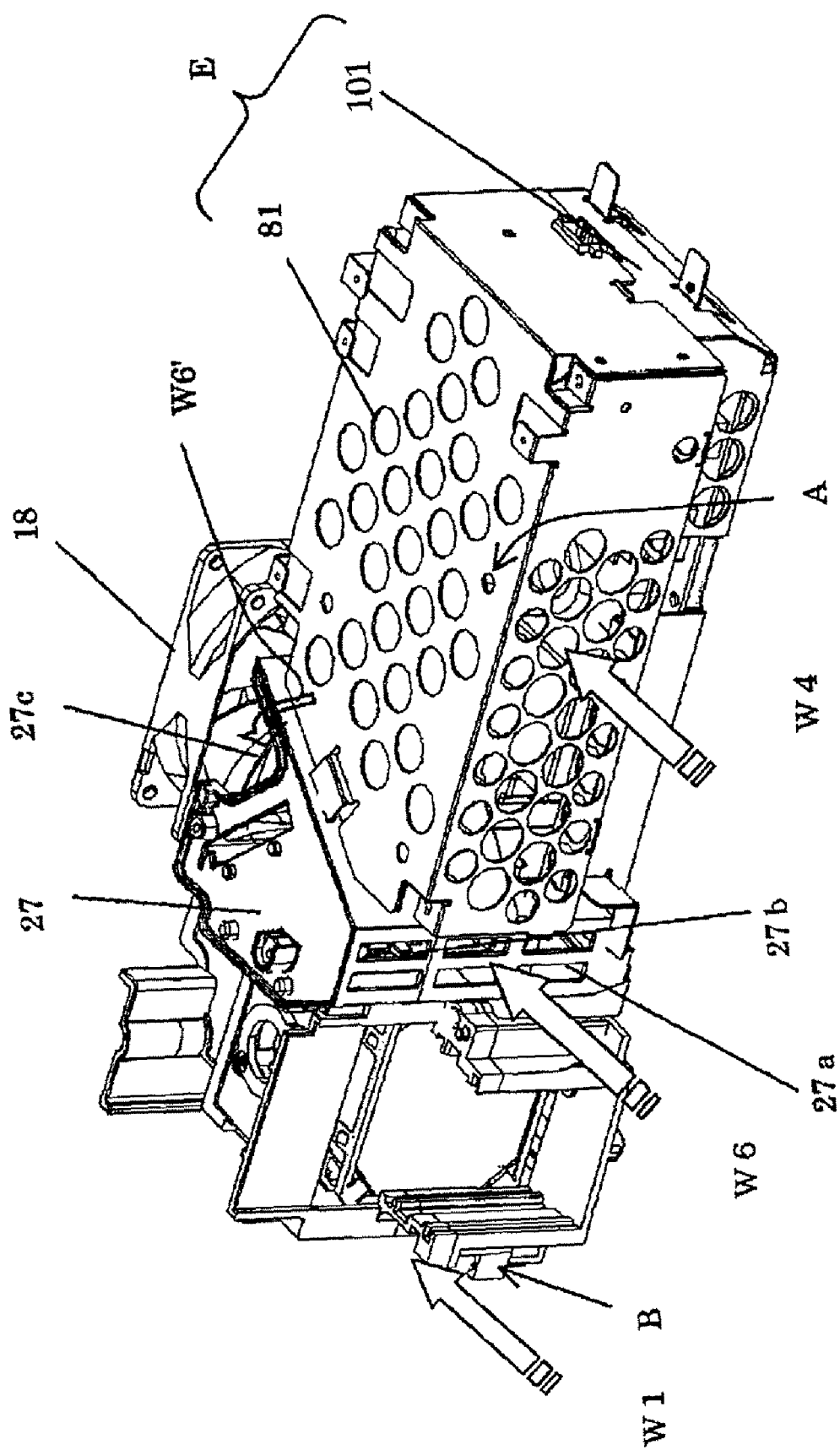
FIG. 2 is a perspective view showing part of the cooling structure in Embodiment 1.

Therefore, in this embodiment, as is also shown in FIG. 2, an airflow opening 27b as a third flow path is provided in the wall portion 27a of the exhaust box 27. The wall portion partitions the exhaust area in the flow path B from the flow path A. The airflow opening 27b introduces part W6 of the cooling airflow in the flow path A into the exhaust box 27.

Furthermore, an airflow opening 27c as another third flow path is provided near the exhaust fan 18 in the top face of the exhaust box 27 to introduce part W6' of the cooling airflow in the flow path A into the exhaust box 27.

Combining the cooling airflows W6 and W6' with the cooling airflow W2 makes it possible to increase the volume and velocity of the cooling airflow W3 which passes through inside the exhaust box 27 including large resistance.

In addition, optimizing the size of the airflow openings 27b and 27c enables to reduce the velocity difference between the cooling airflows W3 and W5 to a level at which generation of the wind noise in the exhaust fan 18 is suppressed.

Furthermore, distancing the combining point of the cooling airflows W3 and W5 from the intake surface of the exhaust fan 18 reduces bias of the volume of the cooling airflow introduced to the exhaust fan 18, thereby further decreasing noise.

Consequently, the airflow reaching the exhaust fan 18 becomes substantially uniform at the intake surface thereof and the bias of the airflow velocity thereat is reduced. Thereby, the wind noise generated when the blade of the exhaust fan 18 cuts across the airflows having a velocity difference can be reduced.

According to the inventor's experiment, in the case where the airflow openings 27b and 27c were not provided in the exhaust box 27, the velocity of the cooling airflow W5 was about 15 m/s, whereas the velocity of the cooling airflow W3 was about 0.27 m/s. Therefore, the noise level was high.

However, in the case where the airflow openings 27b and 27c were provided in the exhaust box 27, the velocity of the cooling airflow W5 was about 1.5 m/s, whereas the velocity of the cooling airflow W3 was about 2.5 m/s. Thereby, the noise level reduced from 51.5 dB in the former case to 48.3 dB in the latter case by 3.2 dB.

The noise reduction effect obtained by combining the cooling airflows W6 and W6' with the cooling airflow W2 was described thus far. Further, an additional effect can also be obtained.

The heat value of the lamp 1 is larger than those of the PFC power source board 8 and the ballast power source board 10. Accordingly, the temperature of the cooling airflow W2 after cooling of the lamp 1 is inevitably increased. Therefore, if the cooling airflow W2 is directly exhausted to the outside through the exhaust port 24a of the second side plate 24, the hot air may be blown to the user or the temperature of the second side plate 24 may be increased.

However, exhausting the cooling airflow W3 produced by combining the cooling airflows W6 and W6' having temperatures lower than that of the cooling airflow W2 with the cooling airflow W2 in the exhaust box 27 can decrease the exhaust temperature to solve the abovementioned problem. In other words, this embodiment can achieve a low-noise projector capable of decreasing the temperatures of the exhaust air and the exterior member.

The above embodiment described the case where an axial flow fan is used as the exhaust fan 18. However, various fans such as a sirocco fan may be used as the exhaust fan 18.

Embodiment 2

Next, description will be made of the cooling structure in a liquid crystal projector that is Embodiment 2 of the present invention. As is understood from the experimental example described in Embodiment 1, the velocity difference (bias) between the cooling airflows W3 and W5 still remains even though the airflow openings 27b and 27c are provided in the exhaust box 27.

Figure 3:
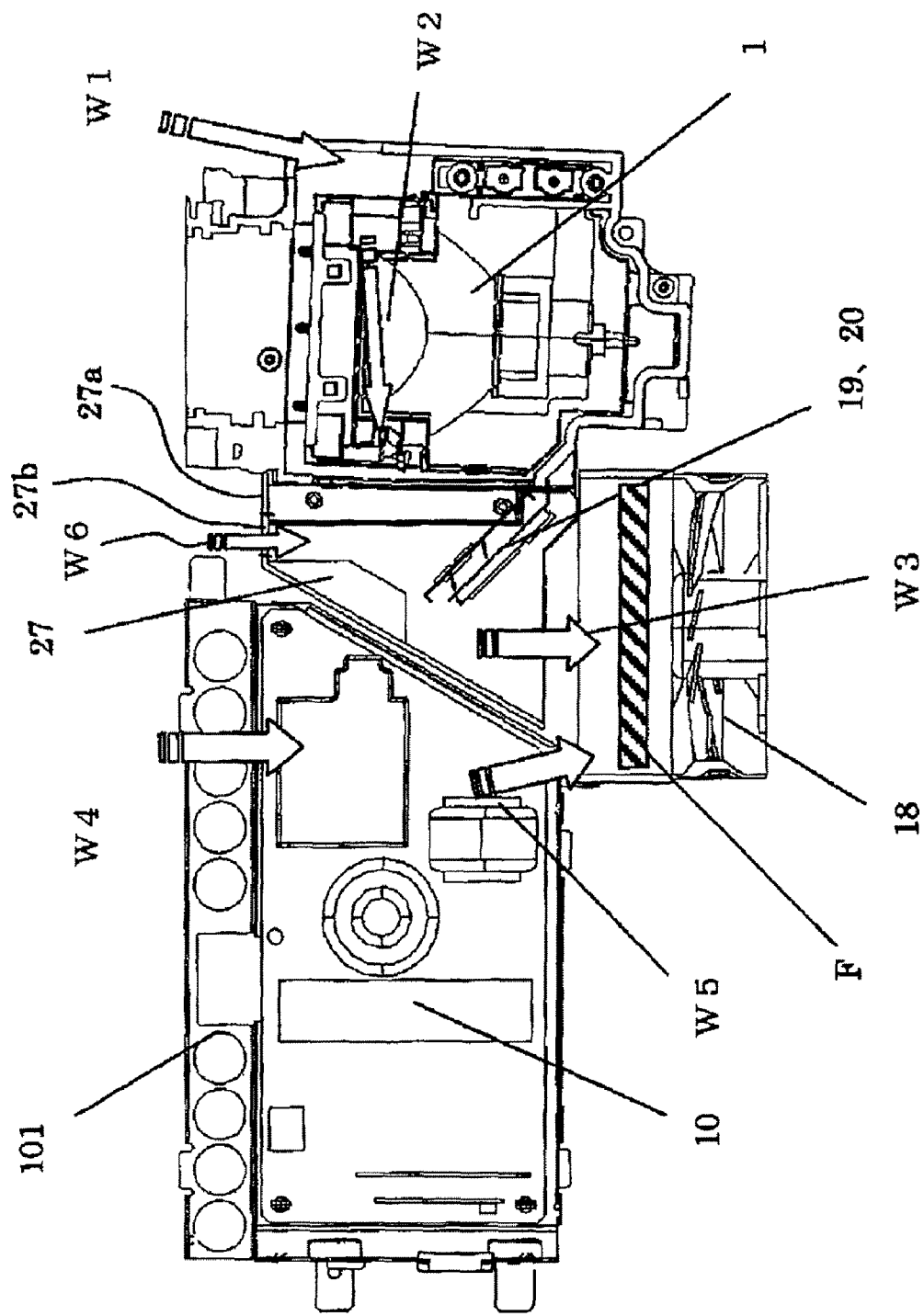
FIG. 3 is a plane view showing part of the cooling structure in the liquid crystal projector that is Embodiment 2 of the present invention.

Thus, in this embodiment, a flow-uniforming member F is provided between the exhaust box 27 and the intake surface of the exhaust fan 18 as shown in FIG. 3.

The flow-uniforming member F is formed of a member having multiple holes (pores) such as a filter, a punching metal and a net. The shape and material of the flow-uniforming member F are selected such that the intake resistance of the exhaust fan 18 is not excessively large.

The flow-uniforming member F can uniform the velocity of the two cooling airflows W3 and W5 that flow into the exhaust fan 18, thereby enabling to further reduce the wind noise generated in the exhaust fan 18.

According to the abovedescribed embodiments, in the case where the airflows are introduced to one fan from the first flow path for cooling the light source and the second flow path for cooling the constituent parts other than the light source, the third airflow is first combined with the first airflow after it cooled the light source.

For cooling the light source (lamp) that requires a strict temperature management, an airflow velocity (volume) is set lower than that for cooling the other constituent parts. Therefore, the velocity of the original first airflow is much lower than that of the second airflow.

However, combining the third airflow with the first airflow that cooled the light source reduces the velocity difference between the combined airflow immediately before it enters the fan and the second airflow. In particular, in the case where the light-shielding member that is large resistance to the airflow is provided in the exhaust area, the abovementioned velocity difference can be reduced. Thereby, it is possible to reduce the wind noise generated in the fan. Consequently, a low-noise image projection apparatus can be achieved.

Furthermore, combining the third airflow having a low temperature with the first airflow having a high temperature due to cooling of the light source can decrease the exhaust temperature.

Although the preferred embodiments of the present invention were described above, a transmissive liquid crystal panel and a digital micro mirror device (DMD) can be used as the light modulation element. In addition, the cooling airflow W6 and W6' can be directly introduced from the outside of the projector into the exhaust box 27.

Furthermore, the present invention is not limited to these preferred embodiments and various variations and modifications may be made without departing from the scope of the present invention.

This application claims foreign priority benefits based on Japanese Patent Application No. 2006-027728, filed on Feb. 3, 2006, which is hereby incorporated by reference herein in its entirety as if fully set forth herein.

What is claimed is:

1. An image projection apparatus configured to project an image using light from a light source, the apparatus comprising:
    a first flow path configured to pass a first airflow for cooling the light source;
    a second flow path configured to pass a second airflow for cooling constituent parts other than the light source;
    an exhaust box including a first opening, the first opening forming a third flow path configured to pass a third airflow, and the exhaust box receiving the first airflow from the first flow path; and
    a fan configured to exhaust the second airflow and combined airflow from the exhaust box, the combined airflow from the exhaust box including the first airflow and the third airflow, but not including the second airflow, which passes outside of the exhaust box to the fan, wherein the third airflow is derived from the second airflow that enters the second flow path, wherein the exhaust box further includes a second opening, which forms a fourth flow path configured to pass a fourth airflow for cooling the constituent parts other than the light source, wherein a first surface of the exhaust box where the first opening is formed and a second surface of the exhaust box where the second opening is formed face different directions, wherein the combined airflow from the exhaust box further includes the fourth airflow, and wherein the third airflow and the fourth airflow are derived from the second airflow that enters the second flow path.

2. The image projection apparatus according to claim 1, wherein the first and second surfaces of the exhaust box are perpendicular to each other.

3. The image projection apparatus according to claim 1, wherein the first opening and the second opening in the exhaust box have sizes configured to cause a velocity difference between the second airflow and the combined airflow to be at a level at which generation of wind noise in the fan is suppressed.

4. The image projection apparatus according to claim 1, wherein the constituent parts other than the light source include at least one of electrical system parts for driving the light source and optical system parts which act on the light introduced from the light source to a projection optical system.

5. The image projection apparatus according to claim 1, wherein the fan is an axial flow fan.

6. The image projection apparatus according to claim 1, wherein the third airflow is exhausted to the outside by the fan, without cooling the light source.

7. An image display system comprising:

an image projection apparatus; and an image supply apparatus configured to supply image information to the image projection apparatus, wherein the image projection apparatus is configured to project an image based on the image information using light from a light source, the image projection apparatus comprising:

a first flow path configured to pass a first airflow for cooling the light source;

a second flow path configured to pass a second airflow for cooling constituent parts other than the light source;

an exhaust box including a first opening, the first opening forming a third flow path configured to pass a third airflow, and the exhaust box receiving the first airflow from the first flow path; and a fan configured to exhaust the second airflow and combined airflow from the exhaust box, the combined airflow from the exhaust box including the first airflow and the third airflow, but not including the second airflow, which passes outside of the exhaust box to the fan, wherein the third airflow is derived from the second airflow that enters the second flow path, wherein the exhaust box further includes a second opening, which forms a fourth flow path configured to pass a fourth airflow for cooling the constituent parts other than the light source, wherein a first surface of the exhaust box where the first opening is formed and a second surface of the exhaust box where the second opening is formed face different directions, wherein the combined airflow from the exhaust box further includes the fourth airflow, and wherein the third airflow and the fourth airflow are derived from the second airflow that enters the second flow path.

* * * * *